United States Patent
Doetsch et al.

(10) Patent No.: US 6,888,877 B2
(45) Date of Patent: May 3, 2005

(54) CDMA RECEIVER

(75) Inventors: Markus Doetsch, Koblenz (DE); Tideya Kella, München (DE); Peter Schmidt, Erpolzheim (DE); Peter Jung, Otterberg (DE); Joerg Plechinger, München (DE); Michael Schneider, München (DE)

(73) Assignee: Infineon Technologies AG, Munich (DE)

( * ) Notice: Subject to any disclaimer, the term of this patent is extended or adjusted under 35 U.S.C. 154(b) by 578 days.

(21) Appl. No.: 09/936,771

(22) PCT Filed: Jan. 17, 2001

(86) PCT No.: PCT/EP01/00494

§ 371 (c)(1),
(2), (4) Date: Jan. 17, 2002

(87) PCT Pub. No.: WO01/54322

PCT Pub. Date: Jul. 26, 2001

(65) Prior Publication Data

US 2004/0213332 A1  Oct. 28, 2004

(30) Foreign Application Priority Data

Jan. 17, 2000   (DE) .......................................... 100 01 649

(51) Int. Cl.⁷ ............................................... H04B 1/707
(52) U.S. Cl. ....................... 375/147; 375/148; 370/342; 370/335
(58) Field of Search ................................ 375/147, 148, 375/144; 370/342, 335

(56) References Cited

U.S. PATENT DOCUMENTS 5,671,221 A   9/1997  Yang
5,812,542 A   9/1998  Bruckert et al.
6,757,272 B1 * 6/2004  Abeta et al. ................. 370/342

FOREIGN PATENT DOCUMENTS

DE   196 15 257 A1   10/1996
DE   197 36 624 C1   1/1999

OTHER PUBLICATIONS

DSP Division, "24–Bit Digital Signal Processor User's Manual," Motorola, Incorporated (Austin, TX), p. 3–1–3–7, (1996).

* cited by examiner

Primary Examiner—Temesghen Ghebretinsae
(74) Attorney, Agent, or Firm—Jenkins, Wilson & Taylor, P.A.

(57) ABSTRACT

CDMA Receiver. According to one embodiment, a CDMA receiver is provided for receiving a CDMA signal in a multi-subscriber environment. The multi-subscriber environment can include a receiving device for receiving the CDMA signal. Further, the environment can include a Rake receiving circuit for detection of signal components of the CDMA signal which are transmitted via the various signal paths. The environment can also include a channel estimation circuit for estimating channel coefficients of a transmission channel coefficient h of a transmission channel H by means of a predetermined reference data sequence contained in the received CDMA signal. A weighting coefficient calculation device can calculate weighting coefficients for the various signal components of the CDMA signal. Further, the environment can include a weighting circuit for weighting the signal components with the calculaed weighting coefficients. A combiner can combine the weighted signal components to form an estimated received data signal.

11 Claims, 3 Drawing Sheets

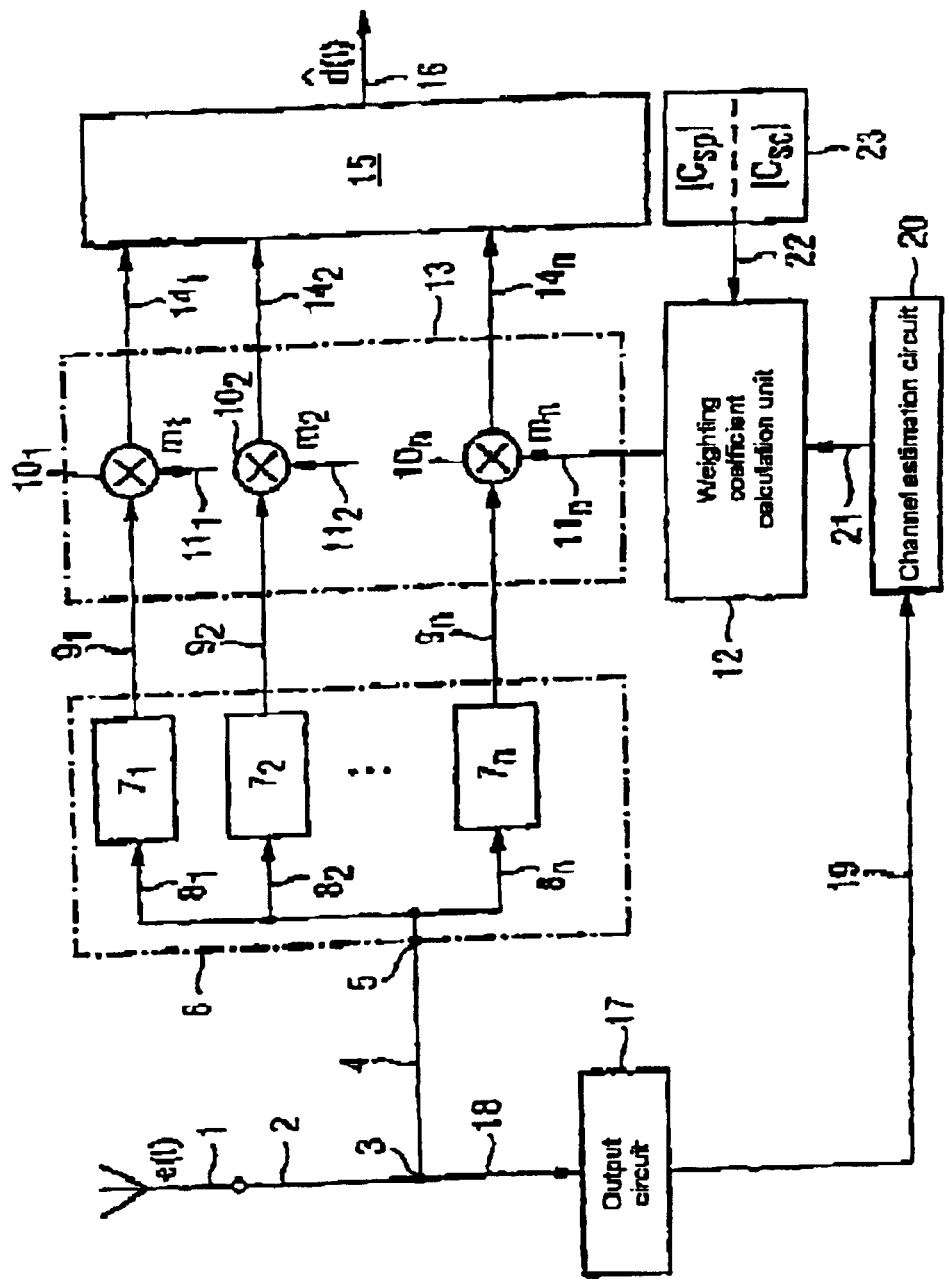

CDMA RECEIVER

TECHNICAL FIELD

The invention relates to a CDMA receiver for receiving a CDMA signal, which is transmitted at the chip clock rate from a transmitter via various signal paths of a physical transmission channel.

RELATED ART

The CDMA method (CDMA: Code Division Multiple Access) is a channel access method which is used in cellular systems, in particular in the mobile radio field. In this case, a narrowband signal is spread by means of a code to form a broadband signal. The subscriber signals from those subscribers who are active at the same time in the same subscriber frequency band are band-spread by the application of subscriber-specific CDMA codes. In the CDMA method, a fingerprint, which is as unique as possible, is printed onto each data symbol. This can be achieved by using orthogonal OVSF coders.

FIG. 1 shows one cell in a cellular mobile radio system, in which three subscribers or users U1, U2, U3 are located within one mobile radio cell and receive a CDMA transmitted signal from the base station BS. A subscriber U receives a CDMA signal from the base station BS via a physical channel path H. The physical channel H comprises a large number of signal propagation paths which occur, for example, owing to reflections or signal scatter.

FIG. 2 shows a simple model for data transmission from the base station to a subscriber U. A data stream d(t) is produced in the base station, and is spread, coded and scrambled to form a transmitted signal S(t) by means of a CDMA transmitter in the base station. The transmitted signal passes via the physical channel H as a received signal e(t) to the subscriber's CDMA receiver. In the CDMA receiver, the received signal is descrambled and despread or decoded to form an estimated data stream $\hat{d}(t)$, which normally corresponds to the data stream d(t) which the CDMA transmitter receives.

FIG. 3 shows a CDMA transmitter according to the prior art. The transmitter receives data streams d1, d2, . . . $d_k$, which are intended for different subscribers, from different data sources in parallel. The data streams d are spread and coded in an associated spreading circuit, using OVSF codes that are orthogonal in pairs. The spread and coded data streams are fed to an adder. The adder superimposes the various spread and coded data streams, and passes the integrated data stream on to a scrambling circuit. The superimposed data stream is scrambled and is emitted from the base station BS as the transmitted data stream s to the subscribers U. The scrambling process is used by the subscriber to identify the base station BS.

FIG. 4 shows a CDMA receiver according to the prior art. The CDMA received signal e(t) received by the subscriber U via a receiving antenna A is fed to a Rake receiving circuit. The Rake receiving circuit has a number of signal paths which run in parallel with one another and each comprise a delay device, a descrambling circuit and a despreading circuit. The various parallel-connected signal paths are also referred to as Rake fingers. The Rake receiving circuit is used to detect the various signal components of the transmitted CDMA transmitted signal, which are produced by the various signal paths of the physical transmission channel. In this case, the delay device takes account of the various signal propagation time delays on the various signal paths of the transmission channel. The delay times in the delay devices are adjustable, and can be adapted to the transmission channel during reception of the CDMA signal. The various signal components in the CDMA received signal are descrambled in the various Rake fingers, and are then despread by means of an OVSF code. On the output side, the CDMA signal components detected by the Rake fingers are multiplied by weighting coefficients by means of multipliers, and are converted in a combiner into an estimated data signal $\hat{d}$. The combiner is an addition circuit which adds the various weighted signal components. The weighting coefficients m are calculated in a weighting coefficient calculation unit on the basis of estimated channel coefficients h, which are determined by a channel estimation circuit. This is done by outputting a reference data sequence by means of an output circuit from the CDMA received signal e(t), which sequence is descrambled in a descrambling circuit and, after despreading in a despreading circuit, is passed to the channel estimation circuit.

The CDMA receiver according to the prior art as shown in FIG. 4 has the disadvantage, however, that it is impossible to eliminate signal interference between different subscribers or users within one mobile radio cell. The CDMA receiver illustrated in FIG. 4 is suitable only for single subscriber detection, in which case the intersymbol interference and the multiple-access interference between the subscribers cannot be overcome, so that only a low spectrum efficiency can be achieved. The CDMA receiver shown in FIG. 4 has no data relating to the spreading codes $C_{SP}$ of the other subscribers in the cell. It thus cannot take any account of or suppress interference caused by the signals transmitted by other subscribers in that cell.

SUMMARY OF THE INVENTION

The object of the present invention is thus to provide a CDMA receiver in which signal interference which is caused by signals transmitted by other subscribers is overcome.

According to the invention, this object is achieved by a CDMA receiver having the features specified in Patent Claim 1.

The invention provides a CDMA receiver for receiving a CDMA signal, which is transmitted at the chip clock rate from a transmitter via various signal paths of a physical transmission channel, in a multi-subscriber environment, having a receiving device for receiving a CDMA signal, having a Rake receiving circuit with a number of parallel-connected delay devices for detection of signal components of the CDMA signal which are transmitted via different signal paths, having a channel estimation circuit for estimating channel coefficients of a combined transmission channel by means of a predetermined reference data sequence which is contained in the received CDMA signal, having a coefficient calculation device for calculating weighting coefficients for the various signal components of the CDMA signal as a function of the estimated channel coefficients and of stored spreading and scrambling codes, having a weighting circuit for weighting the signal components with the calculated weighting coefficients, and having a combiner for combining the weighted signal components to form an estimated received data signal for further data processing.

One advantage of the CDMA receiver according to the invention is that the conventional Rake receiver structure can be retained.

The CDMA receiver according to the invention effectively overcomes signal interference between different subscribers in one cell. This allows the number of subscribers within one cell to be increased, and the data can be transmitted at a higher data rate from the base station to the subscribers. The suppression of multi-access interference also reduces the bit error rate by means of the CDMA receiver according to the invention.

The weighting coefficient calculation device is preferably connected to a memory device.

The memory device preferably stores spreading codes for the other subscribers as well as the scrambling code for the transmitter.

In one preferred embodiment, the combiner is an adder for addition of the weighted signal components.

The reference data sequence is preferably processed by the channel estimation circuit at the chip clock rate.

The delay devices in the Rake receiving circuit delay the reception of the CDMA signal with an associated time delay, with the time delay between the various delay devices preferably differing by precisely one chip clock cycle.

The receiving device preferably has a receiving antenna and a sampling circuit for sampling the received CDMA signal.

Furthermore, an output circuit is preferably provided for outputting the reference data sequence from the received CDMA signal.

In one preferred embodiment of the CDMA receiver according to the invention, the weighting circuit comprises a large number of multiplication circuits, which are each followed by a delay device.

In one particularly preferred embodiment of the CDMA receiver according to the invention, a buffer store is provided for buffer storage of the sampled CDMA received data.

The channel estimation circuit and the weighting coefficient calculation unit are preferably provided by a sequence in an appropriate algorithm in a DSP processor.

BRIEF DESCRIPTION OF THE DRAWINGS

A preferred embodiment of the CDMA receiver according to the invention will be described in the following text in order to explain features which are essential to the invention, with reference to the attached figures, in which:

FIG. 5 shows one preferred embodiment of the CDMA receiver according to the invention.

DETAILED DESCRIPTION OF THE INVENTION

Figure 1:
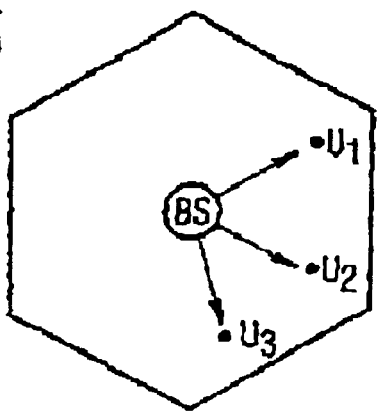
FIG. 1 shows a schematic illustration of a mobile radio cell with a number of subscribers.
Figure 2:
FIG. 2 shows a simple data channel model.

As can be seen from FIG. 5, the CDMA receiver according to the invention has a receiving antenna 1, which is used for receiving a CDMA signal which is transmitted from a base station and is received as the received signal e(t) by the antenna 1. The antenna 1 passes the received CDMA signal e(t) via a line 2 to an output node 3, which is connected via a line 4 to a signal input 5 of a Rake receiving circuit 6. The Rake receiving circuit 6 has a large number of delay devices $7_1, 7_2, 7_n$. The delay devices 7 are connected in parallel with one another via internal signal lines $8_1, 8_2, 8_n$, with the signal lines 8 being connected to the signal input 5 of the Rake receiving circuit 6. The delay devices $7_1$–$7_n$ are connected on the output side via lines $9_1$–$9_n$ to multiplication circuits $10_1$–$10_n$. The multiplication circuits $10_1$–$10_n$ respectively multiply the signal components of the CDMA received signal which are emitted from the delay devices $7_1$–$7_n$ by respective weighting coefficients $m_1$–$m_n$, which are emitted via lines $11_1$–$11_n$ from a weighting coefficient calculation device 12. The multiplier circuits $10_1$–$10_n$ together form a weighting circuit 13. The signal components emitted by the multipliers $10_1$–$10_n$ are emitted via lines $14_1$–$14_n$ to a combiner 15, which combines the various weighted signal components to form an estimated received data signal $\hat{d}$(t) which is emitted via a data line 16 for further data processing in the receiver.

The CDMA signal e(t) received via the antenna 1 contains a reference data sequence which is output at the output point 3 by means of an output circuit 17. The output circuit 17 is for this purpose connected via a line 18 to the output node 3. The reference data sequence which is output by the output circuit 17 is supplied via a line 19 directly to a channel estimation circuit 20. The channel estimation circuit estimates the channel coefficients h of the physical transmission channel H by means of the output reference data sequence, and emits the determined channel coefficients h via a line 21 to the weighting coefficient calculation device 12.

The weighting coefficient calculation device 12 is connected via a memory read line 22 to a memory device 23. The spreading codes $C_{SP}$ for the other subscribers U as well as the scrambling code $C_{SC}$ for the base stations BS are stored in the memory device 23. The weighting coefficient calculation device 12 calculates the weighting coefficients m for the various signal components of the CDMA signal as a function of the estimated channel coefficients h, and of the stored spreading codes $C_{SP}$ and scrambling codes $C_{SC}$. The calculated weighting coefficients m are emitted via lines $11_1$–$11_n$ to the various multiplier circuits $10_1$–$10_n$ in the weighting circuit 13, where they are multiplied by the signal components emitted from the delay devices $7_1$–$7_n$. The signal components weighted in this way are combined with one another in the combiner 15 to form an estimated received data stream $\hat{d}$(t). The combiner 15 is in this case preferably an adder, which adds up the various weighted signal components.

A CDMA received signal is received through the antenna 1 by the receiver, and depends on the transmitted signal s and the physical transmission channel H. The physical transmission channel may be represented as a data matrix H comprising a large number of channel coefficients h. Using the vector notation, the received data vector e becomes:

$$\bar{e} = [H] \cdot \bar{s} \qquad (1)$$

The CDMA receiver may likewise be represented as a data matrix M, with the estimated data vector being obtained from the received data vector to give:

$$\tilde{d} = [M] \cdot \bar{e} \qquad (2)$$

The estimated data vector $\hat{d}$ thus depends on the data matrix H for the physical transmission channel, and on the receiver matrix M.

$$\tilde{\hat{d}} = [M] \cdot [H] \tilde{s} \quad (3)$$

Figure 3:
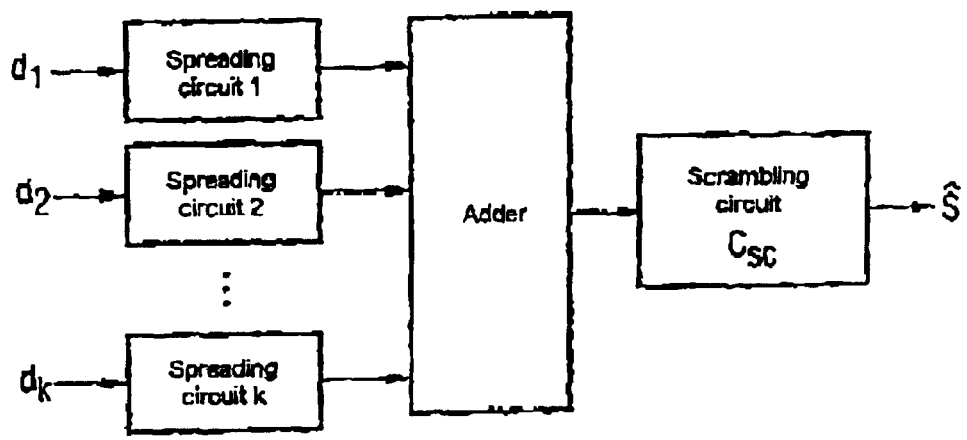
FIG. 3 shows a CDMA transmitter according to the prior art.

The transmitted data vector depends on the data d originally emitted from a data source to the transmitter, on the spreading code $C_{SP}$ and on the scrambling code $C_{SC}$. As has already been explained in conjunction with FIG. 3, the data stream d is first of all spread by means of a spreading code $C_{SP}$ in the transmitter, and is then scrambled in a scrambling circuit by means of a scrambling code $C_{SC}$.

The estimated data vector thus becomes:

$$\tilde{\hat{d}} = [M][H][C_{SP}][C_{SC}] \cdot \bar{d} \quad (4)$$

Since the physical transmission channel (t) and the spreading circuit and scrambling circuit are regarded as a combined channel, the coefficient matrix for the combined channel H' becomes;

$$[H']=[H][C_{SP}][C_{SP}] \quad (5)$$

The received estimated data vector $\hat{d}$ thus depends on the coefficient matrix for the receiver M and on the coefficient matrix H' for the combined channel.

$$\tilde{\hat{d}} = [M] \cdot [H'] \cdot \bar{d} \quad (6)$$

In the case of an assumed, ideally estimated physical transmission channel, the coefficients m of the receiver matrix M must be set by the weighting coefficient calculation device 12 such that:

$$[M] \cdot [H'] \to I \quad (7)$$

where I corresponds to the unit matrix.

The signal coefficients h of the physical transmission channel H are received by the weighting coefficient calculation device 12 from the channel estimation circuit 20 via the line 21. The spreading coefficients $C_{SP}$ of the orthogonal OVSF codes of the other subscribers are stored in the memory 23, and can be read by the weighting coefficient calculation device 12 via the line 22.

The scrambling code $C_{SC}$ of the base stations BSs is likewise stored in the memory 23, and is read by the weighting coefficient calculation device 12 in order to calculate the channel coefficients for the combined channel H'.

The weighting coefficient calculation device 12 contains a processor, which carries out the calculation defined in equation 7 and calculates the weighting coefficients m of the receiver in such a manner that the product of the receiver matrix M and of the channel coefficient matrix H' of the combined channel approximates to the unit matrix I.

Figure 4:
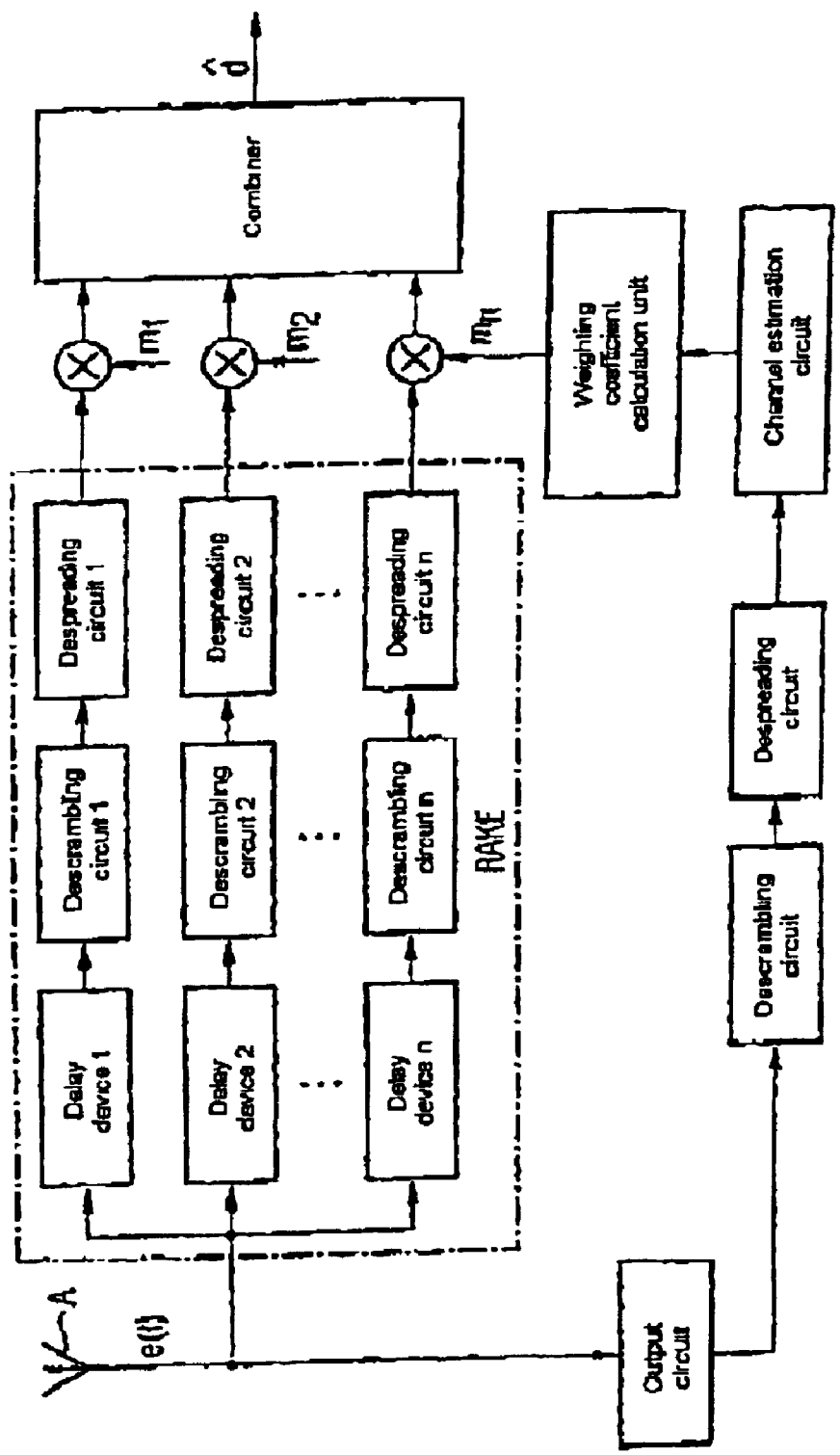
FIG. 4 shows a CDMA receiver according to the prior art.

As can be seen key comparing FIG. 4, which shows the CDMA receiver according to the prior art, and FIG. 5, which shows the CDMA receiver according to the invention, the circuitry of the CDMA receiver according to the invention is less complex. The Rake receiving circuit 6 of the CDMA receiver according to the invention comprises only the delay devices $7_1$–$7_n$, and does not contain any descrambling circuits or despreading circuits for the respective signal components. Furthermore, the output circuit 17 in the CDMA receiver according to the invention is connected directly to the channel estimation circuit 20 via the line 19. The reference data sequence which is output by the output circuit 17 is processed by the channel estimation circuit 20 using the chip clock rate $T_c$ and not using the symbol data clock rate $T_D$. The delay devices $7_1$–$7_n$ in the Rake receiving circuit 6 delay the received CDMA signal e(t) by an associated time delay τ, with the time delay τ differing by precisely one chip clock cycle $T_c$ between the various delay devices $7_1$–$7_n$.

The CDMA receiver according to the invention has the memory 23, in which the spreading codes $C_{SP}$ of all the subscribers and the scrambling codes $C_{SC}$ of the base stations BS are stored. This means that the CDMA receiver according to the invention can also take into account the orthogonal spreading codes of the other subscribers in the cell, and hence the signal received from them, when calculating the weighting coefficients m. In the process, the weighting coefficient calculation device 12 calculates the weighting coefficients m in such a manner that signal interference resulting from the CDMA transmitted signals emitted to the other subscribers is suppressed or overcome. In the process, the channel estimation circuit 20 estimates the transmission channel H at the chip clock level $T_C$, and not at the data symbol level $T_D$.

The stored spreading codes for the other subscribers allow the CDMA receiver according to the invention to carry out multi-subscriber detection, which takes account not only of the intersymbol interference but also of multiple-access interference, and hence has improved spectrum efficiency.

LIST OF REFERENCE SYMBOLS

1 Antenna
2 Line
3 Output node
4 Line
5 Signal input
6 Rake receiving circuit
$7_1$–$7_n$ Delay devices
$8_1$–$8_n$ Signal lines
$9_1$–$9_n$ Signal lines
$10_1$–$10_n$ Multiplication circuits
$11_1$–$11_n$ Lines
13 Weighting circuit
$14_1$–$14_n$ Signal lines
15 Combiner
16 Output line
17 Output circuit
18 Line
19 Line
20 Channel estimation circuit
21 Line
22 Memory read line
23 Memory device

What is claimed is:

1. CDMA receiver for receiving a CDMA signal, which is transmitted at a chip clock rate from a transmitter via various signal paths of a physical transmission channel, in a multi-subscriber environment having:
   (a) a receiving device for receiving the CDMA signal;
   (b) a Rake receiving circuit having a number of parallel-connected delay devices for detection of signal components of the CDMA signal which are transmitted via the various signal paths;
   (c) a channel estimation circuit for estimating channel coefficients h of a transmission channel H by means of a predetermined reference data sequence which is contained in the received CDMA signal;
   (d) a weighting coefficient calculation device for calculating weighting coefficients m for the various signal components of the CDMA signal as a function of the estimated channel coefficients h and of stored spreading and scrambling codes;

(e) a weighting circuit for weighting the signal components with the calculated weighting coefficients m; and having (f) a combiner for combining the weighted signal components to form an estimated received data signal.

2. CDMA receiving according to claim 1, wherein the weighting coefficient calculation device is connected to a memory device.

3. CDMA receiving according to claim 1, wherein spreading codes $C_{sp}$ of the subscriber and scrambling codes $C_{sc}$ from the transmitter are stored in a memory device.

4. CDMA receiver according to claim 1, wherein the combiner is an adder for adding the weighted signal components.

5. CDMA receiver according to claim 1, wherein the reference data sequence is processed by the channel estimation circuit at the chip clock rate $T_c$.

6. CDMA receiving according to claim 1, wherein the delay devices of the Rake receiving circuit delay the received CDMA signal by an associated time delay T differing by precisely one chip clock cycle $T_C$ between the various delay devices.

7. CDMA receiver according to claim 1, wherein an output circuit is provided for outputting the reference data sequence from the received CDMA received signal.

8. CDMA receiver according to claim 1, wherein the weighting circuit comprises a large number of multiplication circuits, which are each followed by a delay device.

9. CDMA receiver according to claim 1, wherein the channel estimation circuit is a DSP processor.

10. CDMA receiver according to claim 1, wherein the weighting coefficient calculation device is a DSP processor.

11. CDMA receiver according to claim 2, wherein the memory device is an RAM memory.

* * * * *